(12) United States Patent
Raad et al.

(10) Patent No.: US 6,169,939 B1
(45) Date of Patent: Jan. 2, 2001

(54) METHOD OF GENERATING A VEHICLE LATERAL ACCELERATION SIGNAL FOR USE IN AN ACTIVE TILT CONTROL SYSTEM

(75) Inventors: Joseph Mikhael Raad, Southgate; Steven A. Hermann, Canton; George Nicholas Villec, Ann Arbor, all of MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/149,235

(22) Filed: Sep. 8, 1998

(51) Int. Cl.[7] ............................... G05D 1/00; G05D 3/00
(52) U.S. Cl. .................... 701/1; 701/36; 701/37; 701/38; 701/48; 303/150; 280/5.508
(58) Field of Search .................... 701/1, 36, 37, 701/38, 48; 280/5.508; 303/150

(56) References Cited

U.S. PATENT DOCUMENTS

| | | |
|---|---|---|
| 4,657,280 | 4/1987 | Ohmori . |
| 4,712,807 | 12/1987 | Kurosawa . |
| 4,948,164 | 8/1990 | Hano et al. . |
| 5,087,068 | 2/1992 | Fukanaga et al. . |
| 5,092,624 | 3/1992 | Fukuyama et al. . |
| 5,291,406 | 3/1994 | Williams et al. . |
| 5,295,074 | 3/1994 | Williams . |
| 5,383,680 | * 1/1995 | Bock et al. ................ 280/714 |
| 5,510,986 | * 4/1996 | Williams .............. 364/424.05 |
| 5,948,028 | * 9/1999 | Raad et al. ................ 701/37 |
| 6,002,974 | * 12/1999 | Schiffmann .............. 701/36 |
| 6,035,251 | * 3/2000 | Hac et al. ................. 701/70 |
| 6,053,510 | * 4/2000 | Kokotovic ............... 280/5.508 |
| 6,053,583 | * 4/2000 | Izumi et al. ............. 303/150 |
| 6,073,065 | * 6/2000 | Brown et al. ............ 701/36 |
| 6,076,027 | * 6/2000 | Raad et al. ............... 701/38 |
| 6,076,837 | * 6/2000 | Kokotovic ............... 280/5.504 |

* cited by examiner

*Primary Examiner*—William A. Cuchlinski, Jr.
*Assistant Examiner*—Ronnie Mancho
(74) *Attorney, Agent, or Firm*—Gregory P. Brown

(57) ABSTRACT

A method is provided for generating a vehicle lateral acceleration signal for use in an active tilt control system in a vehicle having a sprung mass center of gravity. A single lateral accelerometer is mounted at the sprung mass center of gravity of the vehicle to generate a first lateral acceleration signal ($a_{cg}$). A second lateral acceleration signal ($a_{Lapprox}$) is generated representative of a vehicle lateral acceleration at a point spaced from the sprung mass center of gravity based upon the first lateral acceleration signal for use in the active tilt control system.

7 Claims, 6 Drawing Sheets

METHOD OF GENERATING A VEHICLE LATERAL ACCELERATION SIGNAL FOR USE IN AN ACTIVE TILT CONTROL SYSTEM

TECHNICAL FIELD

The present invention relates to a method of generating a vehicle lateral acceleration signal for use in an active tilt control system, and more particularly, to a method for generating a virtual lateral acceleration signal using an accelerometer mounted at the vehicle center of gravity.

BACKGROUND OF THE INVENTION

Numerous sensors can be used to provide vehicle information necessary for controlling an active tilt control (ATC) system. The sensor set typically consists of various combinations of the following sensors: steering wheel angle sensors, accelerometers, pressure transducers, suspension height sensors, ATC actuator displacement sensors and vehicle speed sensors. The optimal sensor set should be simple, inexpensive, reliable, have few parts, provide a signal that leads vehicle body roll to allow compensation for hydraulic response time and provide the proper signal under all driving conditions.

An attractive solution that has proven to be successful in vehicle evaluations and in ADAMS simulations is a single accelerometer mounted laterally, forward of the vehicle's sprung-mass center of gravity. Using a lateral accelerometer as the sensor set has several benefits. It is cost effective and allows direct measurement of lateral acceleration, which is more accurate than a lateral acceleration signal synthesized from steering wheel angle and vehicle speed. There are many automotive uses for lateral accelerometers, such as airbag systems, braking systems, etc., which will further drive cost reductions through higher volumes.

Mounting the accelerometer forward of the center of gravity (C.G.) adds lead to the signal by coupling yaw acceleration with lateral acceleration. FIGS. 1 through 3 provide graphical illustrations of the behavior of a popular sport utility vehicle when driven through an abrupt double lane change. The steering wheel angle was measured in real time on an ATC equipped vehicle going through the maneuver at 50 mph and then used as an input to an ADAMS model of the vehicle. FIG. 1 illustrates that the steering wheel angle leads the vehicle's body roll angle by roughly 300 msec., which is more than enough time for the hydraulics to react. FIG. 2 illustrates the relationship between yaw acceleration and steering wheel angle. Yaw acceleration is developed almost instantaneously with steering wheel angle input. By locating the lateral accelerometer forward of the sprung mass center of gravity yaw acceleration is super-imposed on the lateral acceleration measured by the accelerometer (in proportion to the distance of the accelerometer from the center of gravity) giving valuable lead time the signal without requiring the added expense and complexity of using a steering wheel angle sensor.

The relationship is governed by the following equation, neglecting roll acceleration affects:

$$a_y = a_{cg} + r^* \alpha$$

where $a_y$ equals lateral acceleration at the accelerometer mounting point; $a_{cg}$ equals lateral acceleration at the sprung mass center of gravity; r equals distance from the sprung mass center of gravity to the accelerometer mounting point; and $\alpha$ equals yaw acceleration.

The further forward the lateral accelerometer is moved, the more predominant the yaw acceleration component becomes and the more the measured signal leads roll. FIG. 3 illustrates the affect of moving the lateral accelerometer forward of the center of gravity by two feet. This configuration is also shown in FIG. 4. The signal from a center of gravity mounted accelerometer leads the body roll by roughly 60 msec. which is insufficient time to react hydraulically. For such a system, abrupt steering inputs would be reacted by hydraulic forces that are out of phase with body roll, resulting in an unnatural and undesirable feeling to the vehicle occupants.

The signal from the forward mounted accelerometer leads body roll by 140 msec., which is optimal for this particular system and would provide a proper amount of lead time on the control signal to provide a linear roll feel to the vehicle. Proper placement of the lateral accelerometer along the longitudinal vehicle axis is required to achieve the full benefit of lead compensation. If the sensor is placed too far forward of the center of gravity, then control signal integrity is sacrificed by adding too much signal lead and by reducing signal amplitude at the point of peak acceleration. Signal amplitude reduction results from the yaw acceleration component subtracting from the center of gravity acceleration component at the point of peak acceleration as shown in FIG. 3. If the sensor is not placed far enough forward of the center of gravity, then insufficient lead will be provided by yaw acceleration to compensate for hydraulic, mechanical and electronic system delays.

As shown in FIG. 4, the lateral accelerometer 10 is mounted to the vehicle 12 forward from the sprung mass center of gravity 14.

A problem with such a system is that the vehicle may not have the appropriate structure to support a lateral accelerometer at the desired location. Furthermore, it may be desirable to measure lateral acceleration at various positions on the vehicle in real time.

SUMMARY OF THE INVENTION

The present invention provides a method of synthesizing a virtual accelerometer at any desired vehicle location by using a conveniently mounted lateral accelerometer and vehicle speed signals.

More specifically, the present invention provides a method of generating a vehicle lateral acceleration signal for use in an active tilt control system. A single lateral accelerometer is mounted at a specific mounting point on the vehicle to generate a first lateral acceleration signal. A second lateral acceleration signal is generated representative of vehicle lateral acceleration at a point spaced from the specific mounting point based upon the first lateral acceleration signal for use in the active tilt control system.

Preferably, the specific mounting point of the lateral accelerometer is the sprung mass center of gravity of the vehicle. In this configuration, a virtual accelerometer may be synthesized mathematically in real time at any desired point with respect to the sprung mass center of gravity of the vehicle for optimizing active tilt control system performance.

Accordingly, an object of the present invention is to provide a synthesized lateral acceleration signal at any point on a vehicle with respect to a single lateral accelerometer mounted to the vehicle, thereby optimizing active tilt control system performance.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
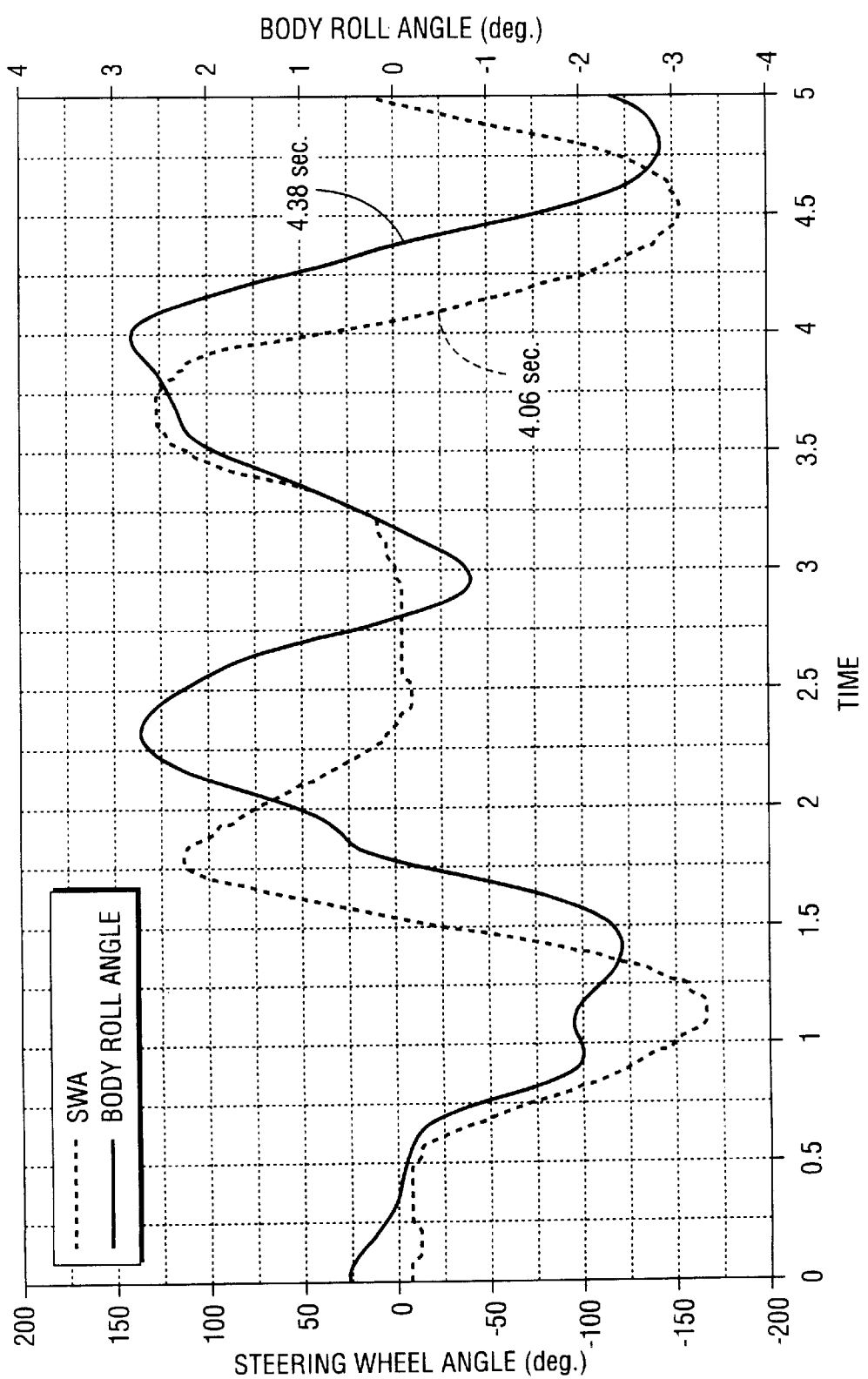
FIG. 1 shows a graphical illustration of steering wheel angle and body roll angle vs. time in a sport utility vehicle in accordance with the prior art.
Figure 2:
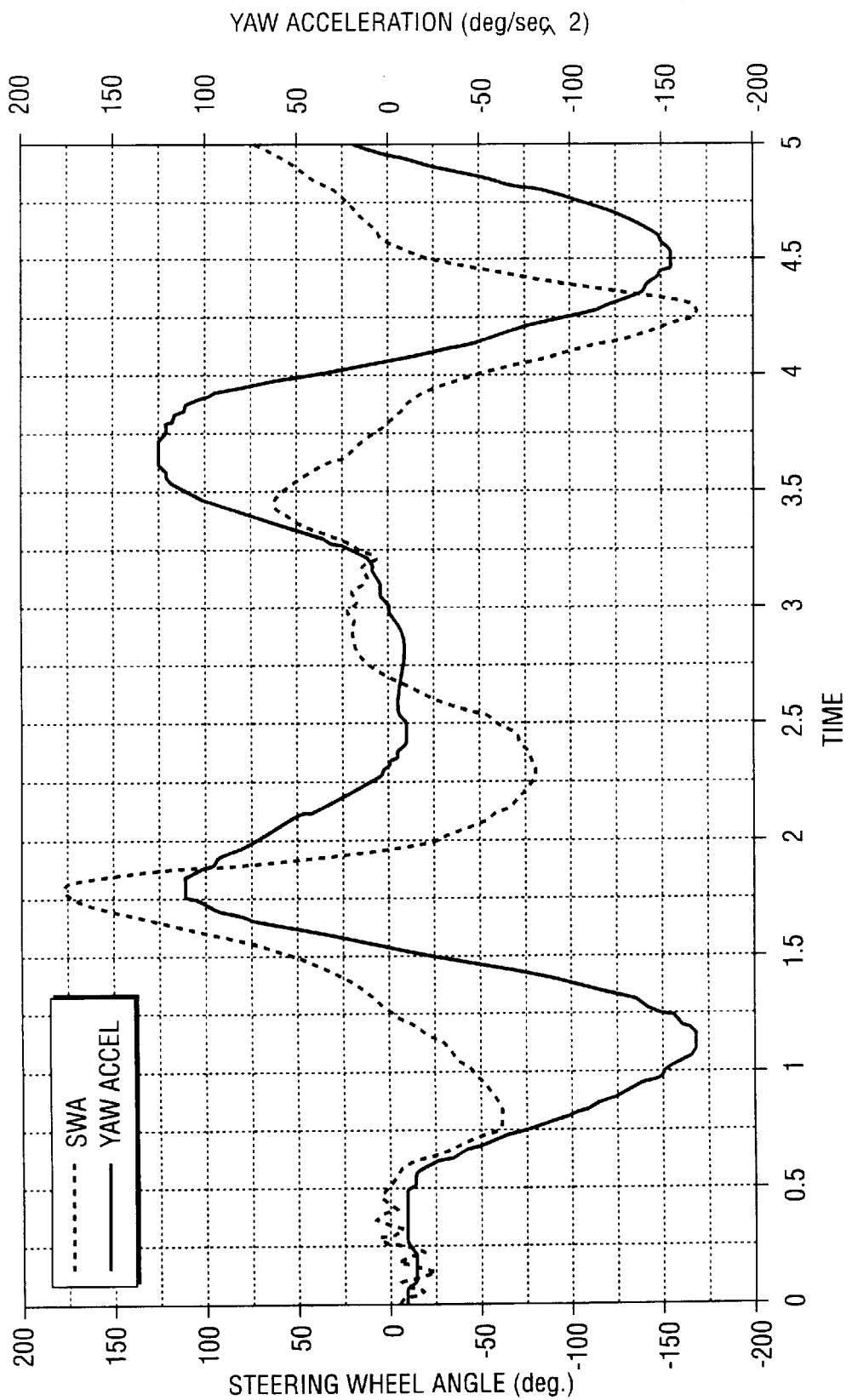
FIG. 2 shows a graphical illustration of steering wheel angle and yaw acceleration vs. time corresponding with FIG. 1.
Figure 3:
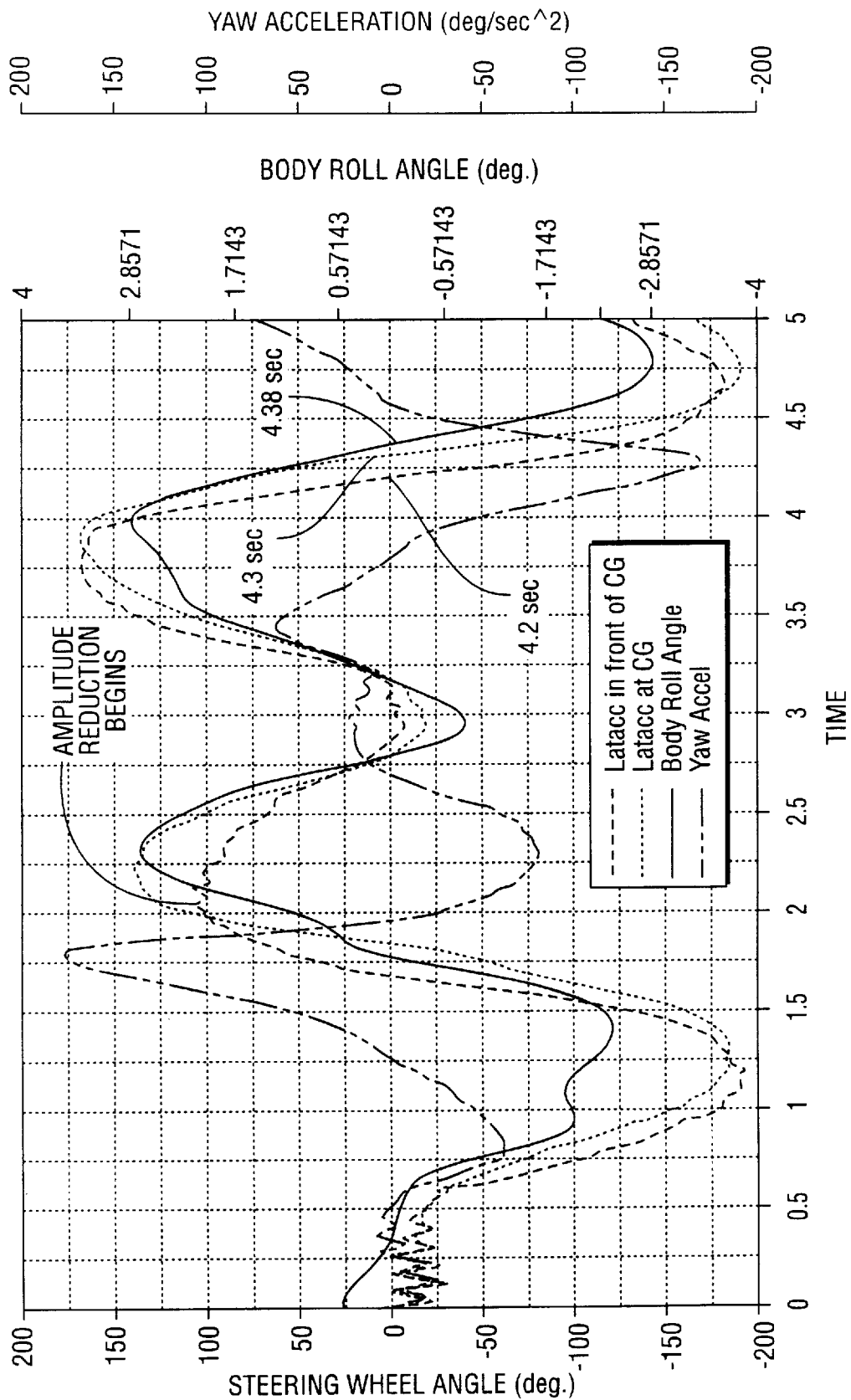
FIG. 3 shows a graphical illustration of lateral acceleration and body roll angle vs. time corresponding with FIG. 1.
Figure 4:
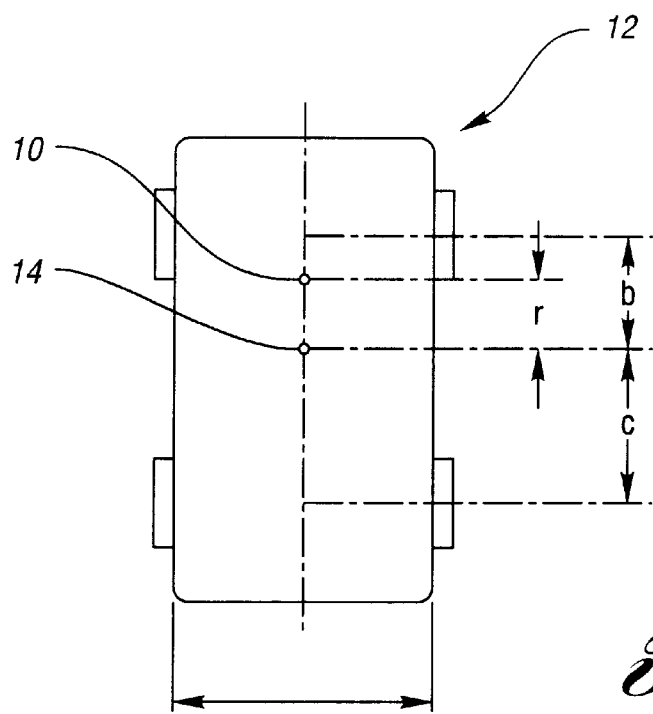
FIG. 4 shows a schematic plan view of a vehicle with a single lateral accelerometer in accordance with the prior art.
Figure 5:
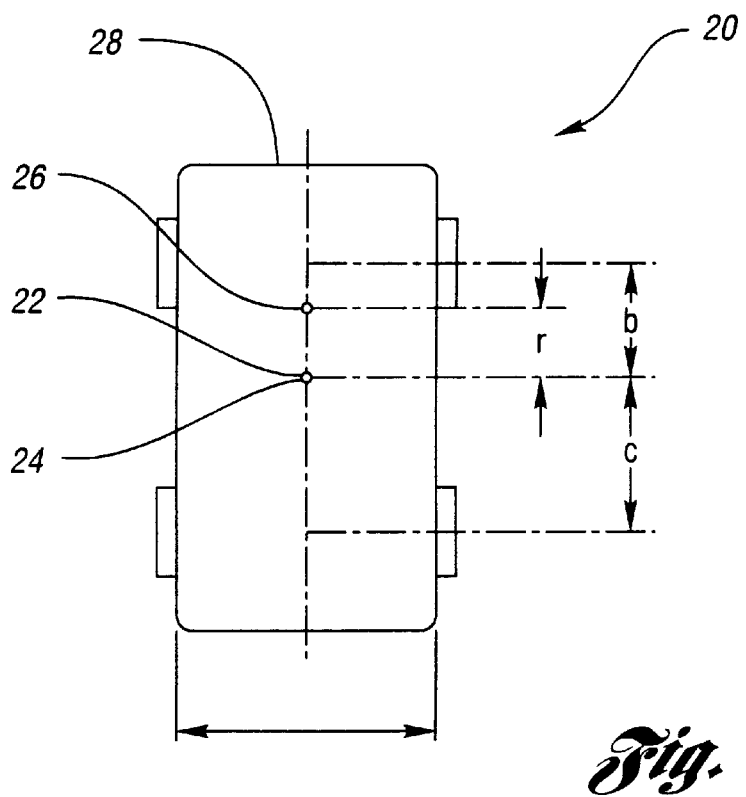
FIG. 5 shows a schematic plan view of a vehicle with a lateral accelerometer in accordance with the present invention.

Referring to FIG. 5, a vehicle 20 is shown in accordance with the present invention. A lateral accelerometer 22 is preferably mounted to the vehicle 20 at the sprung mass center of gravity 24 of the vehicle, however, it is contemplated that the lateral accelerometer may be mounted at another point on the vehicle. The present invention provides a method of synthesizing a virtual lateral accelerometer 26 at a position spaced a distance r from the sprung mass center of gravity 24 toward the front 28 of the vehicle 20. A virtual accelerometer signal is generated using the lateral accelerometer 22 which is mounted at the sprung mass center of gravity 24, as well as a vehicle speed signal.

Neglecting the effects of roll acceleration and assuming constant vehicle forward speed, it can be shown that:

$$a_{cg} = V^* \omega + \dot{v} \quad (1)$$

where $a_{cg}$ equals lateral acceleration at the sprung mass center of gravity, V equals vehicle speed, $\omega$ equals vehicle yaw velocity, and $\dot{v}$ equals time derivative of lateral velocity.

Using the simplifying assumption of $\dot{v}$ equals zero, equation 1 can be modified to provide an approximation of yaw velocity ($\omega$) as follows:

$$a_{cg} = V^* \omega \text{ or } \omega_{approx} = a_{cg}/v \quad (2)$$

It is noted that equation 2 is exact for steady state turns.

The lateral acceleration of a point not on the vehicle's center of gravity can be calculated as follows, again neglecting the affects of vehicle roll acceleration:

$$a_L = a_{cg} + r^* d/dt(\omega) \quad (3)$$

where $a_L$ equals lateral acceleration at a point not on the center of gravity, and r equals distance away from the cg.

Using the approximation for vehicle yaw rate ($\omega$) in equation 2, it can be shown that:

$$d/dt(\omega_{approx}) = d/dt(a_{cg}/V) \quad (4)$$

Plugging this back into equation 3 gives:

$$a_{L\ approx} = a_{cg} + r^* d/dt(a_{cg}/V) \quad (5)$$

Equation 5 gives an approximation of the lateral acceleration of a point not on the center of gravity given two measurable signals: lateral acceleration at the center of gravity, and vehicle speed. Although this equation is only an approximation for a virtual accelerometer, ADAMS modeling and vehicle evaluation in a popular sport utility vehicle shows significant performance improvement over using the center of gravity lateral acceleration signal unmodified or an accelerometer physically mounted forward of the center of gravity.

It can be shown that the exact formulation for synthesizing the lateral acceleration at a point not at the center of gravity is as follows:

$$a_L = a_{cg} + r^* d/dt[(a_{cg} - \dot{v})/V)] \quad (6)$$

Figure 6:
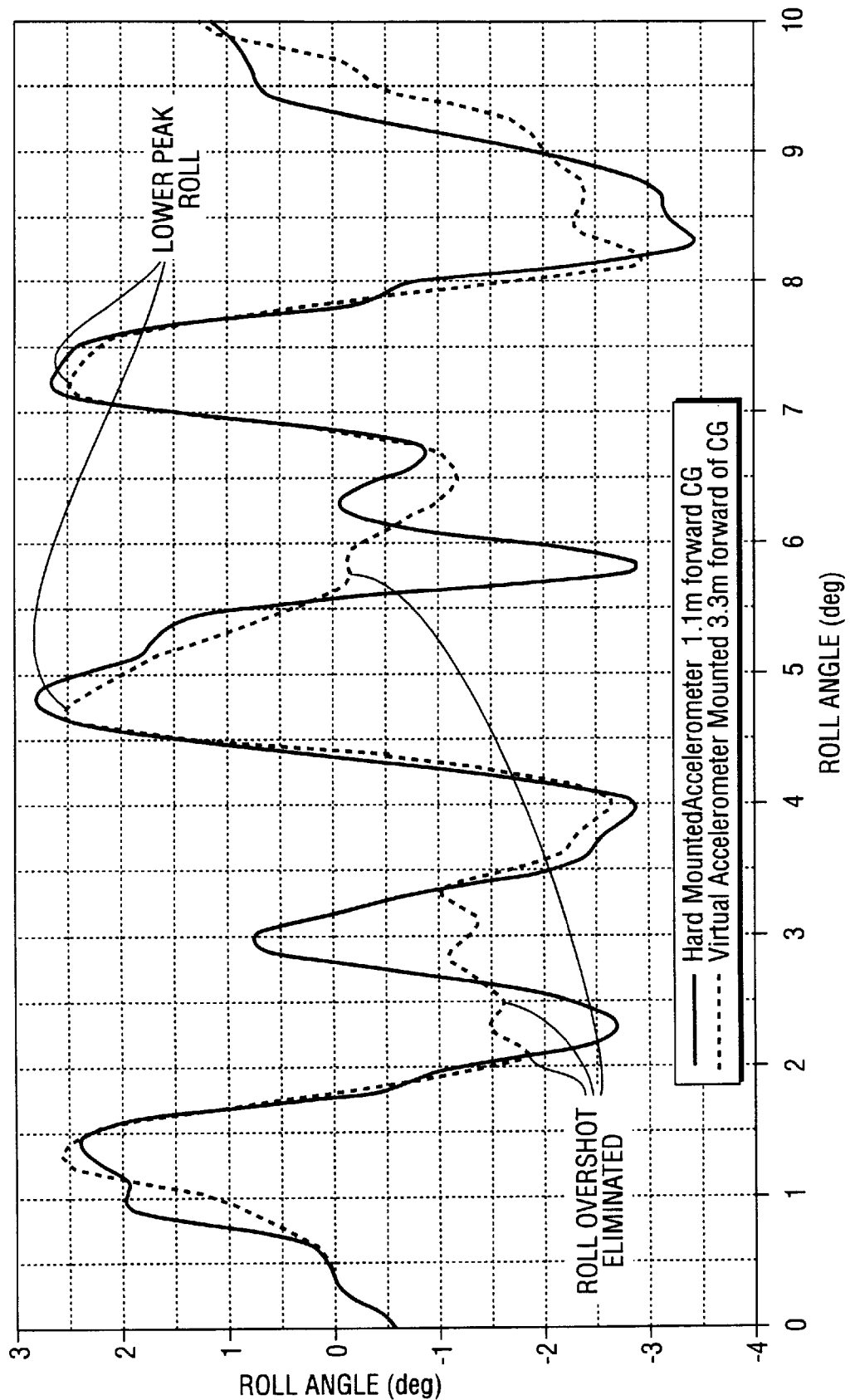
FIG. 6 shows a graphical illustration of vehicle body roll angle vs. time in accordance with the present invention.

FIG. 6 illustrates the performance improvement of a popular sport utility vehicle when controlled using a virtual accelerometer at 3.3 meters forward of the center of gravity verses a hard mounted accelerometer mounted 1.1 meters forward of the center of gravity. The event, simulated using ADAMS, is a severe lane change at high speeds. Both accelerometer signals give the same lead time to the control strategy but the performance using the virtual accelerometer is characterized generally by lower peak roll values and the elimination of roll overshoot.

Figure 7:
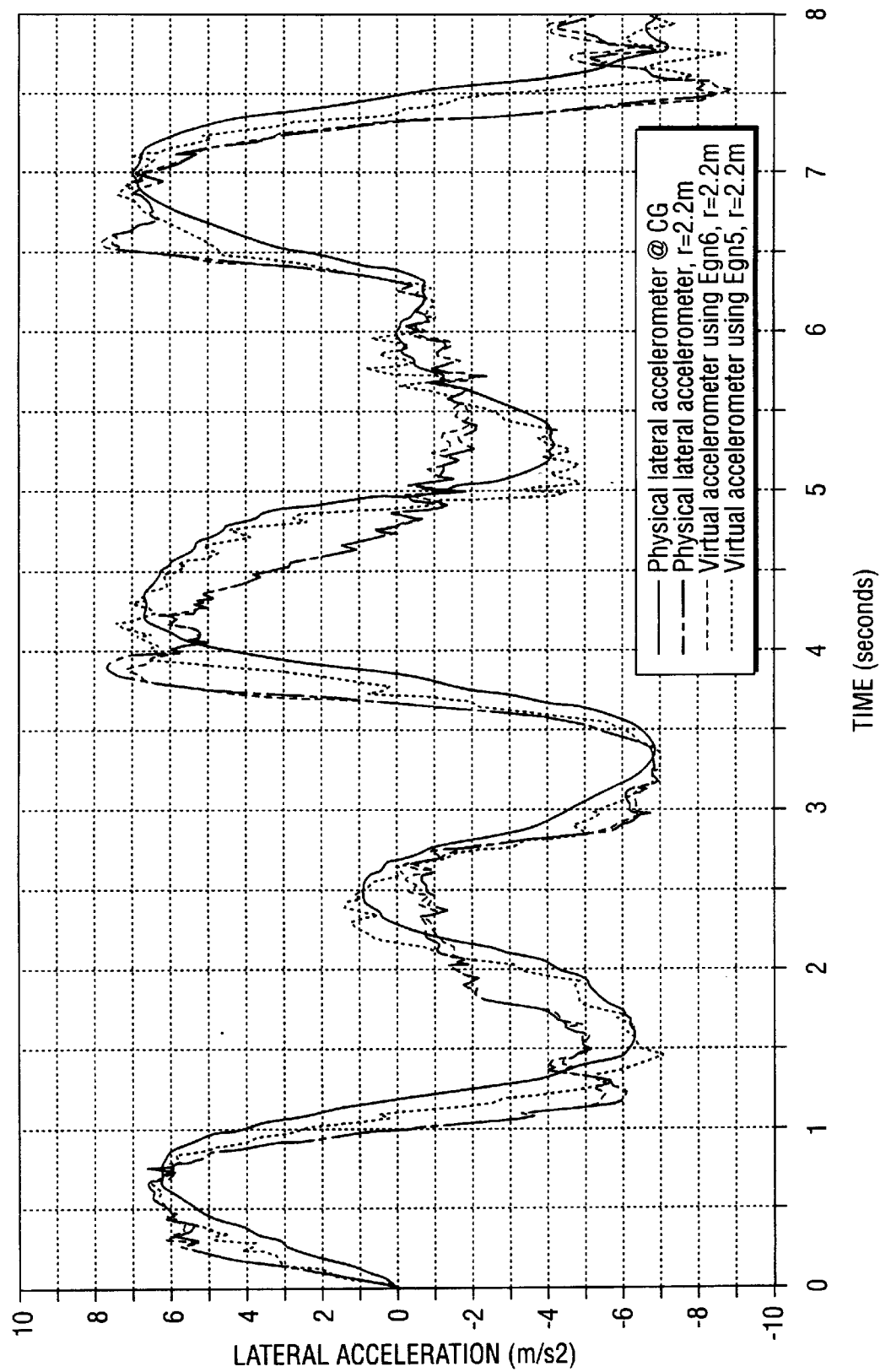
FIG. 7 shows a graphical illustration of lateral acceleration vs. time in accordance with the present invention.

FIG. 7 illustrates the validity of equation 6 and relative performance of equation 5 for another high speed severe lane change assuming one vehicle was equipped with a center of gravity mounted accelerometer and a hard mounted accelerometer 2.2 meters forward of the center of gravity. The equation 6 results lay perfectly over the hard mounted accelerometer results. The equation 5 approximation is also shown to illustrate a signal lead time difference between the hard-mounted accelerometer results and the approximate virtual accelerometer results at the same distance forward of the center of gravity.

With the present invention, the location of the virtual accelerometer can be anywhere in the vehicle regardless of the availability or accessibility of structure to mount on, or even the existence of such structure. For example, a virtual accelerometer can be located three meters in front of the vehicle if desired. Also, the location of the virtual accelerometer can be moved in real time if so desired. For example, when controlling an active tilt control system in a vehicle, it has been established that a forward mounted accelerometer is optimal for providing lead to the control signal. It may be optimal to relocate the virtual accelerometer to be behind the sprung mass center of gravity while operating the vehicle in reverse. Other examples are to make the location of the virtual accelerometer dependent on the vehicle speed and/or magnitude of the lateral acceleration at the center of gravity.

Physically locating an accelerometer too far forward of the center of gravity is undesirable because signal integrity can be compromised by coupling too much yaw acceleration in the signal. Equation 5 for the virtual accelerometer reduces the yaw acceleration coupling. This allows the virtual accelerometer to be placed further forward in the vehicle without compromising the signal integrity. The location of the virtual accelerometer can be changed quickly by changing the calibration. No hardware revisions are required.

Physically locating an accelerometer at the center of gravity is likely to be a safe place for the accelerometer. It is likely inside the passenger compartment protected from exposure to water, contaminants, extreme heat, flying debris, etc. The accelerometer may be located inside the control module for packaging simplification.

While the best mode for carrying out the invention has been described in detail, those familiar with the art to which this invention relates will recognize various alternative designs and embodiments for practicing the invention within the scope of the appended claims.

What is claimed is:

1. A method of generating a vehicle lateral acceleration signal for use in an active tilt control system in a vehicle having a sprung mass center of gravity, the method comprising:

monitoring vehicle speed;

mounting a single lateral accelerometer at the sprung mass center of gravity of the vehicle to generate a first lateral acceleration signal ($a_{cg}$); and generating a second lateral acceleration signal ($a_{Lapprox}$) representative of a vehicle lateral acceleration at a point spaced from the sprung mass center of gravity based upon said first lateral acceleration signal ($a_{cg}$) and said monitored vehicle speed for use in the active tilt control system.

2. The method of claim 1, wherein said step of generating a second lateral acceleration signal ($a_{Lapprox}$) comprises performing the following calculation:

$$a_{L\ approx} = a_{cg} + r * d/dt(a_{cg}/V) \quad (7)$$

where r=distance away from the center of gravity, and V=vehicle forward speed.

3. The method of claim 2, wherein said point spaced from the sprung mass center of gravity is at least one meter forward in vehicle from the sprung mass center of gravity.

4. The method of claim 2, further comprising varying said r variable in real time in response to vehicle operating conditions.

5. A method of generating a vehicle lateral acceleration signal for use in an active tilt control system in a vehicle having a sprung mass center of gravity, the method comprising:

monitoring vehicle speed;

mounting a single lateral accelerometer to the vehicle at a specific mounting point to generate a first lateral acceleration signal; and generating a virtual second lateral acceleration signal ($a_{Lapprox}$) representative of vehicle lateral acceleration at a point spaced from the sprung mass center of gravity based upon said first lateral acceleration signal and based on said monitored vehicle speed for use in the active tilt control system, said point spaced from the sprung mass center of gravity not having an accelerometer.

6. The method of claim 5, wherein said point spaced from the sprung mass center of gravity is at least 1 meter forward in vehicle from the sprung mass center of gravity.

7. The method of claim 5 further comprising varying the distance at which said point is spaced from the sprung mass center of gravity in real time in response to vehicle operating conditions.

* * * * *